United States Patent
Ballesteros

(10) Patent No.: US 10,194,318 B2
(45) Date of Patent: Jan. 29, 2019

(54) SYSTEMS AND METHODS FOR NFC ACCESS CONTROL IN A SECURE ELEMENT CENTRIC NFC ARCHITECTURE

(71) Applicant: Miguel Ballesteros, Roseville, CA (US)

(72) Inventor: Miguel Ballesteros, Roseville, CA (US)

(73) Assignee: Intel IP Corporation, Santa Clara, CA (US)

(*) Notice: Subject to any disclaimer, the term of this patent is extended or adjusted under 35 U.S.C. 154(b) by 0 days.

(21) Appl. No.: 14/128,961

(22) PCT Filed: Sep. 24, 2013

(86) PCT No.: PCT/US2013/061411
§ 371 (c)(1),
(2) Date: Dec. 23, 2013

(87) PCT Pub. No.: WO2015/047224
PCT Pub. Date: Apr. 2, 2015

(65) Prior Publication Data
US 2015/0089586 A1    Mar. 26, 2015

(51) Int. Cl.
*H04W 12/08* (2009.01)
*G06F 21/62* (2013.01)
(Continued)

(52) U.S. Cl.
CPC ............ *H04W 12/08* (2013.01); *G06F 21/44* (2013.01); *G06F 21/62* (2013.01); *H04L 63/102* (2013.01);
(Continued)

(58) Field of Classification Search
USPC ............ 726/3, 2, 21, 36; 713/150, 163, 181; 380/255, 264, 276
See application file for complete search history.

(56) References Cited

U.S. PATENT DOCUMENTS

2009/0247077 A1* 10/2009 Sklovsky ................ G06F 9/445
455/41.1
2010/0162348 A1* 6/2010 Narayanan ............ H04L 63/105
726/1
(Continued)

FOREIGN PATENT DOCUMENTS

EP       2043016        4/2009
KR   10-2012-0096779 A  8/2012

OTHER PUBLICATIONS

International Search Report and Written Opinion received for PCT Patent Application No. PCT/US2013/061411, dated Jun. 26, 2014, 12 pages.
(Continued)

*Primary Examiner* — Sharif E Ullah
(74) *Attorney, Agent, or Firm* — Eversheds Sutherland (US) LLP

(57) ABSTRACT

This disclosure describes systems, methods, and computer-readable media related to near field communication (NFC) access control in a secure element centric NFC architecture. A secure element may receive a request for information and process the received request to identify a first access level associated with the request and a second access level associated with an originator of the request. The secure element may determine if the first access level matches the second access level. If the first access level does not match the second access level, the secure element may transmit a message to the originator of the request indicating a denial of the request. If the first access level does match the second access level, the secure element may transmit the request to a near field communication (NFC) controller, receive information from the NFC controller, and transmit the information from the NFC controller to the originator of the request.

14 Claims, 7 Drawing Sheets

(51) Int. Cl.
*H04L 29/06* (2006.01)
*H04W 4/80* (2018.01)
*H04W 4/00* (2018.01)
*G06F 21/44* (2013.01)

(52) U.S. Cl.
CPC ............ *H04L 63/105* (2013.01); *H04L 63/20* (2013.01); *H04W 4/008* (2013.01); *H04W 4/80* (2018.02)

(56) References Cited

U.S. PATENT DOCUMENTS

| | | | |
|---|---|---|---|
| 2011/0179473 A1* | 7/2011 | Lee | G06F 21/606 726/6 |
| 2012/0159149 A1* | 6/2012 | Martin | H04L 63/0823 713/151 |
| 2012/0317288 A1 | 12/2012 | Campana et al. | |
| 2013/0303085 A1* | 11/2013 | Boucher | H04W 4/008 455/41.1 |
| 2013/0344807 A1* | 12/2013 | Huomo | G06Q 20/045 455/41.1 |

OTHER PUBLICATIONS

Search Report for European Application No. 13894612.4, completed Mar. 23, 2017, 10 pages.

"Secure Element Access Control v0.10.0", Mar. 31, 2012 (Mar. 31, 2012), XP055176957, Retrieved from the Internet: URL: http://amifan.googlecode.com/svn-history/r79/tru nk!Documents/GPD_SE_Access_Control_v0_10_0.pdf.

Roland et al.: "Practical Attack Scenarios on Secure Element-Enabled Mobile Devices", Near Field Communication (NFC), 2012 4th International Workshop on, IEEE, Mar. 13, 2012 (Mar. 13, 2012), pp. 19-24, XP032155320, DOI: 10.1109/NFC.2012.10 ISBN: 978-1-4673-1209-7.

Office Action issued in European Application No. 13894612.4, dated Apr. 12, 2018 (7 pages).

* cited by examiner

SYSTEMS AND METHODS FOR NFC ACCESS CONTROL IN A SECURE ELEMENT CENTRIC NFC ARCHITECTURE

CROSS-REFERENCE TO RELATED APPLICATIONS

The application is a national stage filing under 371 and claims the benefit of priority of PCT/US2013/061411, filed Sep. 24, 2013, entitled "Systems and Methods for NFC Access Control in a Secure Element Centric NFC Architecture." The foregoing application is hereby incorporated by reference in its entirely.

BACKGROUND

As mobile devices, such as smart phones and tablets, become prevalent, users are increasingly utilizing mobile devices to initiate and complete financial transactions. For example, mobile devices may utilize near filed communication (NFC) standards to establish radio communication with NFC enabled devices by touching them together or bringing them in close proximity to exchange data, such as transaction information and payment information. In some cases, mobile devices may obtain information from unpowered NFC chips, known as NFC tags, such as from credit cards. In some embodiments, a direct wired connection between an NFC controller and an application processor of a mobile device may increase the vulnerability of the mobile device being subject to hardware and/or software attacks that may result in sensitive information being obtained by a third-party without the knowledge of the user of the mobile device.

BRIEF DESCRIPTION OF THE DRAWINGS

The detailed description is set forth with reference to the accompanying drawings. The use of the same reference numerals indicates similar or identical components or elements; however, different reference numerals may be used as well to indicate components or elements which may be similar or identical. Various embodiments of the disclosure may utilize elements and/or components other than those illustrated in the drawings, and some elements and/or components may not be present in various embodiments. Depending on the context, singular terminology used to describe an element or a component may encompass a plural number of such elements or components and vice versa.

DETAILED DESCRIPTION

Figure 1:
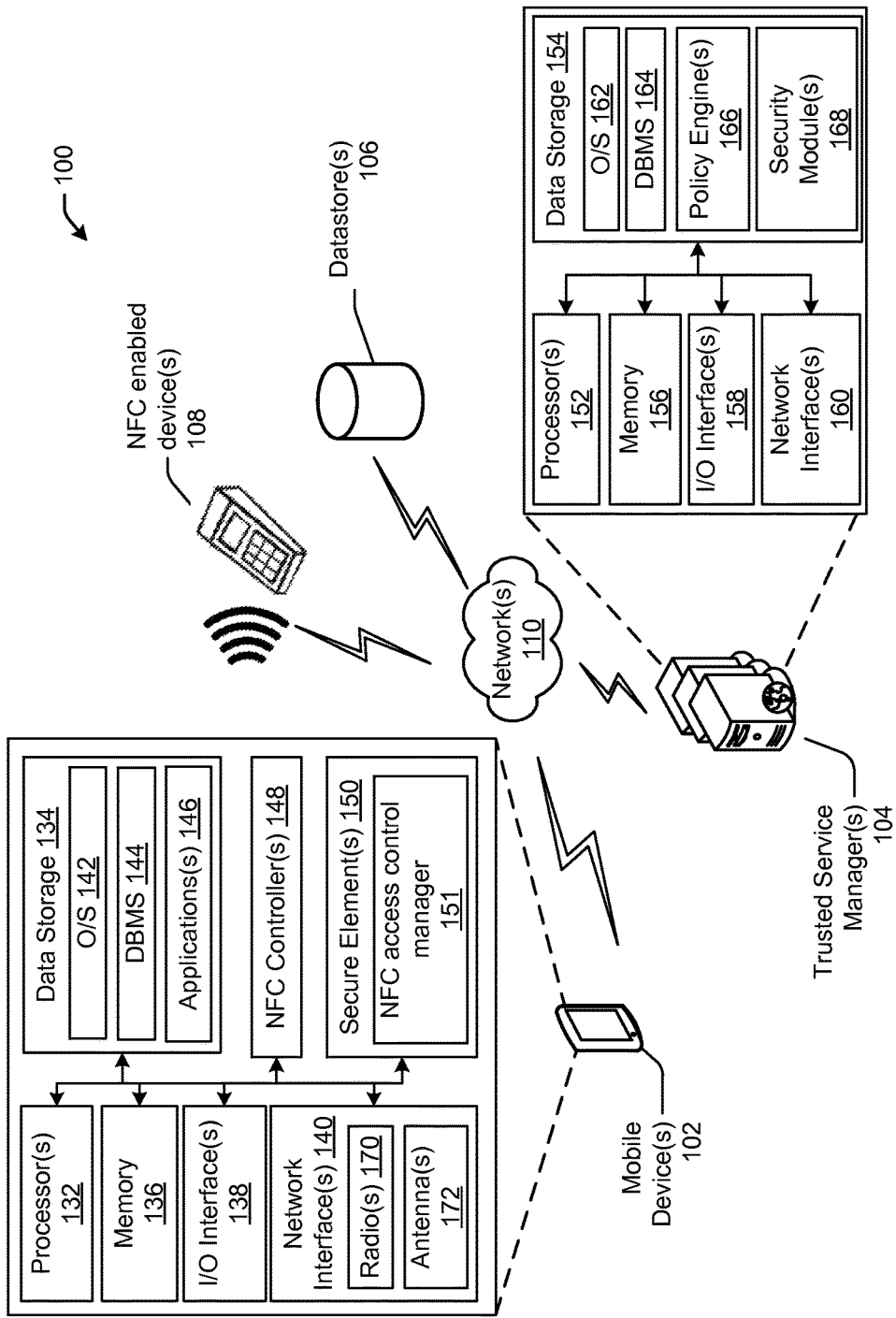
FIG. 1 is a block diagram including various hardware and software components of the illustrative system architecture for NFC access control in a secure element centric architecture in accordance with one or more embodiments of the disclosure.

This disclosure relates to, among other things, systems, methods, computer-readable media, techniques and methodology that enable a secure element centric near field communication (NFC) architecture to provide a software and/or hardware tamper-proof NFC subsystem for scenarios requiring hardware and/or software tamper protections (e.g. as payment acceptance, digital identity, physical and logical access control, etc.). In some embodiments, a secure element is provided between an application processor and an NC controller, eliminating any direct connections between the application processor and the NFC controller. By eliminating the direct connection between the application processor and the NFC controller, the NFC interface provided by the NFC controller is physically isolated from the application processor and any software that may be executed by the application processor (e.g., operating system of a mobile device). All NFC traffic between the application processor and NFC controller may be routed through the secure element.

In some embodiments, the secure element may include an NFC access control manager, which may be in the form of an applet, native application, or Java Card operating system extension. The NFC access control manager may analyze the NFC traffic and determine which transactions are allowed from the host operating system executed by the application processor and which transactions are privileged and must be serviced by a trusted application executing within the secure element. In some embodiments, the access control manager in the secure element may filter NFC traffic received by the secure element to segregate transaction types and enforce access control policies. Access control policies may be generated and encrypted by a trusted service manager, which may then transmit them to the mobile device. The application processor may receive the access control policies and transmit them to the secure element. The access control policies may be decrypted by the access control manager using a secure key and the access control policies may be applied to the received NFC traffic to identify transactions that are privileged and normal. Privileged transactions may be processed by the secure element whereas normal transactions may be processed by the host operating system executed by the application processor.

The secure element may be in the form of an embedded secure element, a universal integrated circuit card (UICC), a secure digital (SD) card, or the like. In some embodiments, the secure element may be any evaluation assurance level (EAL) 4+ certified tamper-proof device.

The access control manager implemented within the secure element may analyze NFC requests (e.g., NFC controller interface request received from an application processor) and apply one or more access control policies to the NFC requests. The access control policies may map the types of NFC transactions to an access level. Depending on the access level, the access control manager may allow or decline the transaction based at least in part on the access level associated with the transaction originator.

Various illustrative embodiments have been discussed above. These and other example embodiments of the disclosure will be described in more detail hereinafter through reference to the accompanying drawings. The drawings and the corresponding description are provided merely for illustration and are not intended to limit the disclosure in any way. It should be appreciated that numerous other embodiments, variations, and so forth are within the scope of this disclosure.

Illustrative System Architectures

FIG. 1 is a block diagram including various hardware and software components of the illustrative system architecture for NFC access control in a secure element centric architecture in accordance with one or more embodiments of the disclosure. Although this disclosure is described in the context of near field communication and/or NFC-based transactions and hardware, the systems and methods described herein may equally apply to other wireless transaction protocols, such as Bluetooth™ or the like. The illustrative system architecture 100 may include one or more mobile device(s) 102 operable by one or more user(s), one or more trusted service manager(s) (TSM) 104, one or more NFC enabled device(s) 108, and/or one or more datastore(s) 106. The mobile device(s) 102 may include any suitable processor-driven mobile computing device including, but not limited to, a laptop computing device, a smartphone, a tablet, and so forth. For ease of explanation, the mobile device(s) 102 may be described herein in the singular; however, it should be appreciated that multiple mobile device(s) 102 may be provided. The TSM(s) 104 may include any suitable processor-driven computing device including, but not limited to, a desktop computing device, a laptop computing device, a server, a smartphone, a tablet, and so forth. For ease of explanation, the TSM(s) 104 may be described herein in the singular; however, it should be appreciated that multiple TSM(s) 104 may be provided.

Any of the mobile devices 102, TSM(s) 104. NFC enabled device(s) 108, and/or datastore(s) 106 may be configured to communicate with each other and any other component of the system architecture 100 via one or more network(s) 110. The network(s) 110 may include, but are not limited to, any one or a combination of different types of suitable communications networks such as, for example, cable networks, public networks (e.g., the Internet), private networks, wireless networks, cellular networks, or any other suitable private and/or public networks. Further, the network(s) 110 may have any suitable communication range associated therewith and may include, for example, global networks (e.g., the Internet), metropolitan area networks (MANs), wide area networks (WANs), local area networks (LANs), or personal area networks (PANs). In addition, the network(s) 110 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof.

The mobile device(s) 102 may include one or more processors (processor(s)) 132 and one or more memories 136 (referred to herein generically as memory 136). The processor(s) 132 may include any suitable processing unit capable of accepting digital data as input, processing the input data based on stored computer-executable instructions, and generating output data. The computer-executable instructions may be stored, for example, in the data storage 134 and may include, among other things, operating system software and application software. The computer-executable instructions may be retrieved from the data storage 134 and loaded into the memory 136 as needed for execution. The processor(s) 132 may be configured to execute the computer-executable instructions to cause various operations to be performed. The processor(s) 132 may include any type of processing unit including, but not limited to, a central processing unit, a microprocessor, a microcontroller, a Reduced Instruction Set Computer (RISC) microprocessor, a Complex Instruction Set Computer (CISC) microprocessor, an Application Specific Integrated Circuit (ASIC), a System-on-a-Chip (SoC), a field-programmable gate array (FPGA), and so forth.

The data storage 134 may store program instructions that are loadable and executable by the processor(s) 132, as well as data manipulated and generated by the processor(s) 132 during execution of the program instructions. The program instructions may be loaded into the memory 136 as needed for execution. Depending on the configuration and implementation of the mobile device(s) 102, the memory 136 may be volatile memory (memory that is not configured to retain stored information when not supplied with power) such as random access memory (RAM) and/or non-volatile memory (memory that is configured to retain stored information even when not supplied with power) such as read-only memory (ROM), flash memory, and so forth. In various implementations, the memory 136 may include multiple different types of memory, such as various forms of static random access memory (SRAM), various forms of dynamic random access memory (DRAM), unalterable ROM, and/or writeable variants of ROM such as electrically erasable programmable read-only memory (EPROM), flash memory, and so forth.

The mobile device(s) 102 may further include additional data storage 134 such as removable storage and/or non-removable storage including, but not limited to, magnetic storage, optical disk storage, and/or tape storage. Data storage 134 may provide non-volatile storage of computer-executable instructions and other data. The memory 136 and/or the data storage 134, removable and/or non-removable, are examples of computer-readable storage media (CRSM).

The mobile device(s) 102 may further include network interface(s) 140 that facilitate communication between the mobile device(s) 102 and other devices of the illustrative system architecture 100 (e.g., TSM(s) 104, datastore(s) 106, etc.) or application software via the network(s) 110. The network interface(s) 140 may include one or more antennas 172 and one or more radios 170, which may include hardware and software for sending and/or receiving wireless signals over the various types of networks 110 described above. The network interface(s) 140 may include one or more radios 170 and antennas 172 that may enable the mobile device 102 to receive and/or send wireless signals to the NFC enabled device(s) 108 and/or trusted service manager(s) 104. The mobile device 102 may further include a radio transceiver (not shown) that may receive and send radio frequency signals. The transceiver (or the receiver and/or the transmitter) may be coupled to one or more antennas (e.g. antennas 172 associated with the mobile device 102).

The mobile device(s) 102 may additionally include one or more input/output (I/O) interfaces 138 (and optionally associated software components such as device drivers) that may support interaction between a user and a variety of I/O devices, such as a keyboard, a mouse, a pen, a pointing device, a voice input device, a touch input device, a display, speakers, a camera, a microphone, a printer, and so forth.

Referring again to the data storage 134, various program modules, applications, or the like may be stored therein that may comprise computer-executable instructions that when executed by the processor(s) 132 cause various operations to be performed. The memory 136 may have loaded from the data storage 134 one or more operating systems (O/S) 142 that may provide an interface between other application software (e.g., dedicated applications, a browser application, a web-based application, a distributed client-server application, etc.) executing on the mobile device 102 and the hardware resources of the mobile device 102. More specifically, the O/S 142 may include a set of computer-executable instructions for managing the hardware resources of the mobile device(s) 102 and for providing common services to other application programs (e.g., managing memory allocation among various application programs). The O/S 142 may include any operating system now known or which may be developed in the future including, but not limited to, any mobile operating system, desktop or laptop operating system, mainframe operating system, or any other proprietary or open-source operating system.

The data storage 134 may further include one or more database management systems (DBMS) 144 for accessing, retrieving, storing, and/or manipulating data stored in one or more datastores. The DBMS 144 may use any of a variety of database models (e.g., relational model, object model, etc.) and may support any of a variety of query languages.

The data storage 134 may additionally include various other program modules that may include computer-executable instructions for supporting a variety of associated functionality. For example, the data storage 134 may include one or more application(s) 146.

The applications(s) 146 may include computer-executable instructions that in response to execution by the processor(s) 132 cause operations to be performed including initiating financial transactions, such as purchases or otherwise requesting sensitive information from NFC enabled devices 108.

The mobile device(s) 102 may further include one or more NFC controller(s) 148.

The NFC controller 148 may be a component that may implement the radio frequency interface or the contactless interface to enable near field communications. The NFC controller 148 may identify and communicate with one or more NFC enabled devices 108. The NFC controller 148 may transmit and receive information to and from NFC enabled devices 108. In some embodiments, the NFC controller 148 may obtain information from unpowered NFC chips also known as NFC tags.

The mobile device(s) 102 may further include one or more secure element(s) 150. The secure element may be in the form of an embedded secure element, a universal integrated circuit card (UICC), a secure digital (SD) card, or the like. In some embodiments, the secure element may be any evaluation assurance level (EAL) 4+ certified tamper-proof device.

The secure element 150 may comprise an access control manager 151 that may receive one or more access control policies from a trusted service manager 104. The one or more access control policies may be generated by the trusted service manager 104, encrypted using a secure key associated with the secure element 150, the secure key having been retrieved from one or more secure datastores (e.g., datastore 106) and transmitted over a secure connection to the mobile device 102 and directed to the access control manager 151 of the secure element 150.

The access control manager 151 may decrypt the received encrypted access control policies from a trusted service manager 104 using a secure key that was stored and/or injected into the secure element 150 at the time of manufacture. The access control manager 151 may receive information from different components (e.g., application processor 132, application 146 executed by the application processor 132, etc.), analyze the information by applying one or more access control policies to the information to identify an access level associated with the originator of the information (e.g. application processor 132, software executed by the application processors, etc.) or the transaction, map the type of transaction, etc. and/or to deny or approve access to the NFC controller 148 based at least in part on the analysis of the information.

Within the data storage 134, one or more modules may be stored. As used herein, the term module may refer to a functional collection of instructions that may be executed by the one or more processor(s) 132. For ease of description, and not by way of limitation, separate modules are described. However, it is understood that in some implementations the various functions provided by the modules may be merged, separated, and so forth. Furthermore, the modules may intercommunicate or otherwise interact with one another, such that the conditions of one affect the operation of another.

The TSM(s) 104 may include one or more processors (processor(s)) 152 and one or more memories 156 (referred to herein generically as memory 156). The processor(s) 152 may include any suitable processing unit capable of accepting digital data as input, processing the input data based on stored computer-executable instructions, and generating output data. The computer-executable instructions may be stored, for example, in the data storage 154 and may include, among other things, operating system software and application software. The computer-executable instructions may be retrieved from the data storage 154 and loaded into the memory 156 as needed for execution. The processor(s) 152 may be configured to execute the computer-executable instructions to cause various operations to be performed. The processor(s) 152 may include any type of processing unit including, but not limited to, a central processing unit, a microprocessor, a microcontroller, a Reduced Instruction Set Computer (RISC) microprocessor, a Complex Instruction Set Computer (CISC) microprocessor, an Application Specific Integrated Circuit (ASIC), a System-on-a-Chip (SoC), a field-programmable gate array (FPGA), and so forth.

The data storage 154 may store program instructions that are loadable and executable by the processor(s) 152, as well as data manipulated and generated by the processor(s) 152 during execution of the program instructions. The program instructions may be loaded into the memory 156 as needed for execution. Depending on the configuration and implementation of the TSM(s) 104, the memory 156 may be volatile memory (memory that is not configured to retain stored information when not supplied with power) such as random access memory (RAM) and/or non-volatile memory (memory that is configured to retain stored information even when not supplied with power) such as read-only memory (ROM), flash memory, and so forth. In various implementations, the memory 156 may include multiple different types of memory, such as various forms of static random access memory (SRAM), various forms of dynamic random access memory (DRAM), unalterable ROM, and/or writeable variants of ROM such as electrically erasable programmable read-only memory (EEPROM), flash memory, and so forth.

The TSM(s) 104 may further include additional data storage 154 such as removable storage and/or non-removable storage including, but not limited to, magnetic storage, optical disk storage, and/or tape storage. Data storage 154 may provide non-volatile storage of computer-executable instructions and other data. The memory 156 and/or the data storage 154, removable and/or non-removable, are examples of computer-readable storage media (CRSM).

The TSM(s) 104 may further include network interface(s) 160 that facilitate communication between the TSM(s) 104 and other devices of the illustrative system architecture 100 (e.g., mobile device(s) 102, datastore(s) 106, etc.) or application software via the network(s) 110. The TSM(s) 104 may additionally include one or more input/output (I/O) interfaces 158 (and optionally associated software components such as device drivers) that may support interaction between a user and a variety of I/O devices, such as a keyboard, a mouse, a pen, a pointing device, a voice input device, a touch input device, a display, speakers, a camera, a microphone, a printer, and so forth.

Referring again to the data storage 154, various program modules, applications, or the like may be stored therein that may comprise computer-executable instructions that when executed by the processor(s) 152 cause various operations to be performed. The memory 156 may have loaded from the data storage 154 one or more operating systems (O/S) 162 that may provide an interface between other application software (e.g., dedicated applications, a browser application, a web-based application, a distributed client-server application, etc.) executing on the TSM(s) 104 and the hardware resources of the TSM(s) 104. More specifically, the O/S 162 may include a set of computer-executable instructions for managing the hardware resources of the TSM(s) 104 and for providing common services to other application programs (e.g., managing memory allocation among various application programs). The O/S 162 may include any operating system now known or which may be developed in the future including, but not limited to, any mobile operating system, desktop or laptop operating system, mainframe operating system, or any other proprietary or open-source operating system.

The data storage 154 may further include one or more database management systems (DBMS) 164 for accessing, retrieving, storing, and/or manipulating data stored in one or more datastores (e.g., datastore 106). The DBMS 164 may use any of a variety of database models (e.g., relational model, object model, etc.) and may support any of a variety of query languages.

The data storage 154 may additionally include various other program modules that may include computer-executable instructions for supporting a variety of associated functionality. For example, the data storage 154 may include one or more policy engine(s) 166 and/or one or more security module(s) 168.

The policy engine(s) 166 may include computer-executable instructions that in response to execution by the processor(s) 152 cause operations to be performed including generating one or more access control policies. In some embodiments, the access control policies may be generated in response to receiving input from a user. In some embodiments, the access control policies may be generated in response to one or more pre-determined events or in response to machine learning algorithms. The policy engine 166 may transmit the one or more access control policies to the security module 168 for encryption.

The security module(s) 168 may include computer-executable instructions that in response to execution by the processor(s) 152 cause operations to be performed including retrieving from one or more secure datastores 106, a secure key associated with a secure element 15 of a mobile device 102. The security module 168 may encrypt the one or more access control policies using the retrieved secure key and facilitate transmittal of the encrypted access control policies to the secure element 150 of the mobile device 102. In some embodiments, the security module 168 may receive encrypted information from the secure element 150 of the mobile device via the application processor and may decrypt the information based at least in part on the retrieved secure key. The security module 168 may then transmit the unencrypted information to a remote server for further processing.

Within the data storage 154, one or more modules may be stored. As used herein, the term module may refer to a functional collection of instructions that may be executed by the one or more processor(s) 152. For ease of description, and not by way of limitation, separate modules are described. However, it is understood that in some implementations the various functions provided by the modules may be merged, separated, and so forth. Furthermore, the modules may intercommunicate or otherwise interact with one another, such that the conditions of one affect the operation of another.

Those of ordinary skill in the art will appreciate that any of the components of the system architecture 100 may include alternate and/or additional hardware, software, or firmware components beyond those described or depicted without departing from the scope of the disclosure. More particularly, it should be appreciated that hardware, software, or firmware components depicted or described as forming part of any of the illustrative components of the system architecture 100, and the associated functionality that such components support, are merely illustrative and that some components may not be present or additional components may be provided in various embodiments. While various program modules have been depicted and described with respect to various illustrative components of the system architecture 100, it should be appreciated that the functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of hardware, software, and/or firmware for implementing the functionality. Accordingly, it should be appreciated that the functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Further, while certain modules may be depicted and described as sub-modules of another module, in certain embodiments, such modules may be provided as independent modules.

Those of ordinary skill in the art will appreciate that the illustrative system architecture 100 is provided by way of example only. Numerous other operating environments, system architectures, and device configurations are within the scope of this disclosure. Other embodiments of the disclosure may include fewer or greater numbers of components and/or devices and may incorporate some or all of the functionality described with respect to the illustrative system architecture 100, or additional functionality.

Figure 2A:
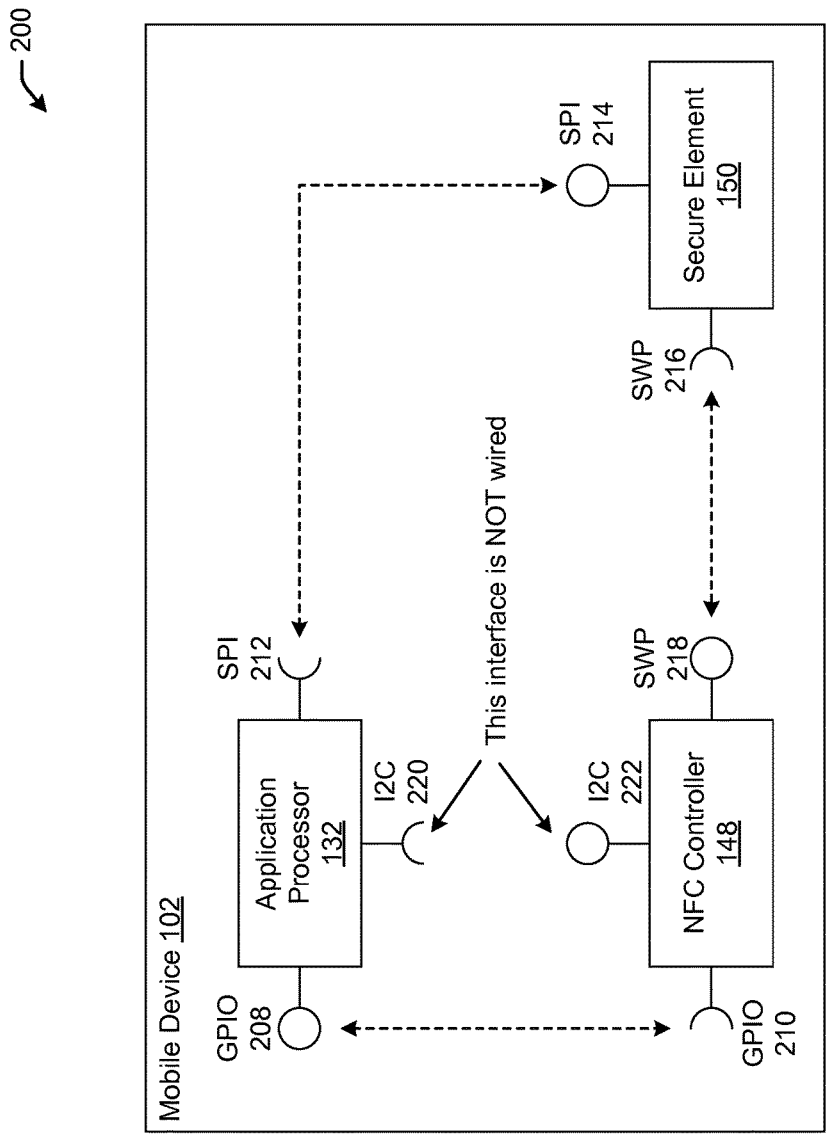
FIGS. 2A-2B are illustrative block diagrams including various architectures for NFC access control in a secure element centric architecture in accordance with one or more embodiments of the disclosure.
Figure 2B:
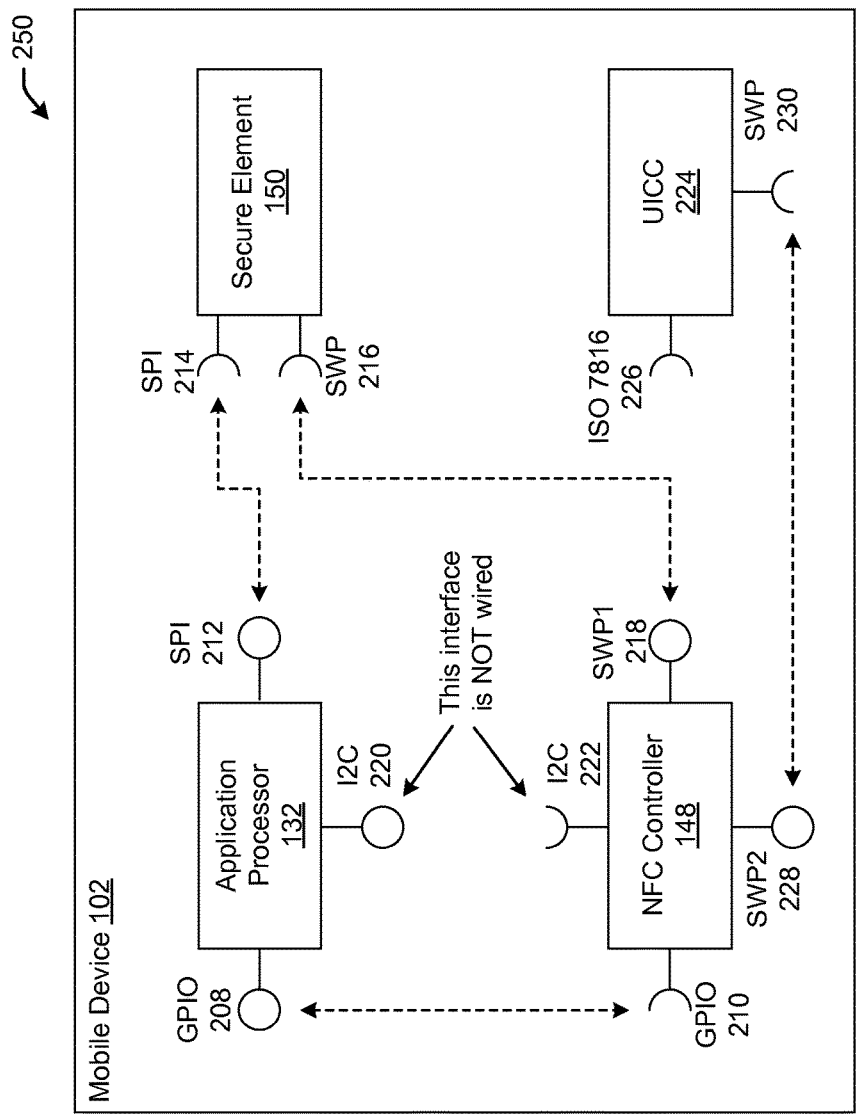

FIGS. 2A-2B are illustrative block diagrams including various architectures for NFC access control in a secure element centric architecture in accordance with one or more embodiments of the disclosure. Specifically, FIG. 2A, illustrates a secure element centric architecture along with the NFC traffic flow between application processor 132 and the NFC controller 148 through a secure element 150. In some embodiments, a mobile device 102 may include one or more application processors 132, one or more NFC controllers 148, and/or one or more secure elements 150. The NFC controller 148 may implement the radio frequency interface or the contactless interface to enable NFC. The NFC controller 148 may identify and communicate with one or more NFC enabled devices 108. NFC enabled devices 108 may be devices capable of communicating with other NFC devices to exchange data over and established radio frequency interface.

The NFC controller 148 may have three different modes. For example, the first mode may be a card emulation where the NFC controller 148 enables the mobile device 102 to act as a credit card in communication with an NFC enabled device (e.g., NFC enable point-of-sale device). The NFC controller 148 may also have a reader/writer mode, where the NFC controller 148 enables the mobile device 102 to read information off of an NFC enabled device 108 or NFC tag or may write information to an NFC enable device 108. The third mode associated with the NFC controller 148 may be the peer-to-peer communication mode, where the NFC controller 148 enables the mobile device 102 to identify nearby NFC enabled devices 108 and bi-directionally exchange information with those devices.

The application processor 132 may include any processor as discussed in FIG. 1. The application processor 132 may be responsible for executing one or more user applications 146 and communicate with one or more trusted service managers 104. In a typical architecture without a secure element 150, the NFC controller 148 and application processor 132 may have a direct connection, such as via an inter-integrated circuit (I2C). An I2C is a multi-master serial single-ended computer bus for attaching low-speed peripherals to a motherboard, embedded system, cellphone, or other electronic device. By eliminating the direct connection between the application processor 132 and the NFC controller 148, the NFC interface provided by the NFC controller 148 may be physically isolated from the application processor 132.

The secure element 150 may be a standalone chip that is capable of withstanding hardware and software attacks and connected to the application processor 132 and the NFC controller 148. The secure element 150 may store sensitive or confidential information, such as keys and credentials and prevent them from being extracted by a third party user or component. The secure element 150 may use the keys for encryption or decryption of signing or verification of digital signatures in such a way that the keys are always present inside of the secure element 150 and not exposed outside of the secure element 150. The access control manager 151 may analyze the NFC traffic and determine which NFC transactions will be permitted from the O/S 142 executed by the application processor 132 and which NFC transactions are sensitive and must be serviced by a trusted application running within the secure element 150. In some embodiments, the access control manager 151 may determine an access level associated with an originator of a request (e.g., application processor 132, software executed by the application processor 132, or the like) and/or the type of data in the request and/or NFC traffic received by the secure element 150.

In some embodiments, at the time of manufacture of the secure element 150, a secure key may be injected and/or stored on the secure element 150. Each secure element 150 may have a unique secure key. The corresponding keys may be stored in a secure datastore (e.g., datastore 106) that may be accessed by a trusted service manager 104. A trusted service manager 104 may only access the datastore 106 over an established secure channel. The key may be used to encrypt or decrypt data on the trusted service manager 104 and/or the secure element 150 of the mobile device 102.

The application processor 132 may include a general-purpose input/output (GPIO) pin 208. The NFC controller 148 may include a corresponding GPIO pin 210. In some embodiments, the GPIO pins 208, 210 may be used to transmit control signals, such as re-setting the mobile device 102, waking up from sleep state, returning to a specific state, entering a specific mode for updates and the like. The GPIO pins 208, 210 are not used to transmit information or data between the application processor 132 and the NFC controller 148.

The application processor 132 may include a serial peripheral interface (SPI) bus 212. The secure element 150 may include a corresponding SPI bus 214. An SPI bus may be synchronous serial data link de facto standard that operates in full duplex mode. Data may be transmitted from the SPI bus 212 to the SPI bus 214 in the form of application protocol data unit (APDU). APDU may be defined by ISO/IEC 7816-4. The payload of an APDU may be an NFC controller interface (NCI) packet.

The secure element 150 may include a single wire protocol (SWP) connector 216. The NFC controller 148 may include a corresponding SWP connector 218. SWP is a specification for a single-wire connection between the secure element 150 and an NFC chip. SWP may be a contact based protocol which is used for contactless communication. Data may be transmitted between SWP connector 216 and SWP connector 218 via Host Controller Protocol (HCP) packets. The payload of an HCP may be an NCI packet.

As depicted in the FIG. 2A, NCI packets may originate from the application processor 132 and may be transmitted from the SPI bus 212 to SPI bus 214 in APDU. The secure element 150 may receive the NCI packets and apply one or more NFC access control policies. The access control manager 151 may use one or more access control policies to map the NFC request type to a required access level. If the originator (e.g., application processor 132) of the request matches the required access level the request may be forwarded to the NFC controller 148. Otherwise, the request may be declined and the originator may be notified.

The granularity of the transaction types may be fine enough to distinguish NFC transactions by RF technology types (e.g. A, B, and F), RF protocols (e.g., T1T, T2T, T3T, ISO-DEP, and NFC-DEP), RF interfaces (e.g., Frame RF, ISO-DEP RF, and NFC-DEP RF), by APDU command types, EFs, and AIDs in the case of ISO-DEP protocols and interfaces. There may be at least two access levels defined: NORMAL and a set of qualified PRIVILEGED levels (e.g. different trusted applications may have different access levels within the PRIVILEGED category). The host software executed by the application processor 132 may be assigned the NORMAL access level, while applications running within the secure element execution environment may be assigned a qualified PRIVILEGED level. The NFC access control policy may be securely provisioned into the secure element 150 at manufacturing time or in the field from a trusted NFC access control management remote system at any time via a secure channel after proper authentication. The access control policy may be managed and enforced within the secure element 150 and updated through communications with one or more trusted service managers 104 over secure connections. The NFC access control manager 151 may be implemented within the secure element 150 as a native application, an applet, or as part of the Java Card OS, as further described in FIGS. 3A-3B.

In one example, an application 146 executed by the application processor 132 may transmit a request to the NFC controller 148 to obtain information. The request may be transmitted to the secure element 150. The NFC access control applet 302 may receive the request and determine whether the request matches the privilege level of the originator. If there is a match, the request may be forwarded to the NFC controller 148. Information received from the NFC controller 148 may be received by the NFC access control applet 302 and forwarded to the originator. If the request does not match the privilege level of the originator, the NFC access control applet 302 may reject the request and notify the originator of the request.

In another example, where the request originator is a privileged component or application (e.g. applet 304A), the NFC access control applet may allow for the privileged component to send and receive information from the NFC controller 148. Applet 304A may be able to access credit card information received over the contactless interface provided by SWP 218 and SWP 216. The applet 304A may transmit the received data to the application processor 132 via SPI 214 and SPI 212. The application processor 132 may utilize the received data to complete a transaction, encrypt the data using one or more known encryption techniques and transmit the data to a remote server for further processing, or the like.

FIG. 2B illustrates a secure element centric architecture along with the NFC traffic flow between application processor 132 and the NFC controller 148 through an secure element 150. This embodiment may be a variation of the implementation in FIG. 2A, where the embodiment in FIG. 2B includes both a secure element 150 and a universal integrated circuit card (UICC) 224. The UICC 224 may be a smart card used in mobile terminals in GSM and UMTS networks that may ensure the integrity and security of personal data. In the embodiment illustrated in FIG. 2B, the NFC controller 148 includes two single wire protocol connectors (e.g., SWP1 218 and SWP2 228). SWP1 connector 218 may communicate with the SWP connector 216 of the secure element 150. SWP2 connector 228 of the NFC controller 148 may communicate with the SWP connector 230 of the UICC 224. The UICC 224 also includes an ISO 7816 interface 226 which is the typical smart card interface.

Figure 3A:
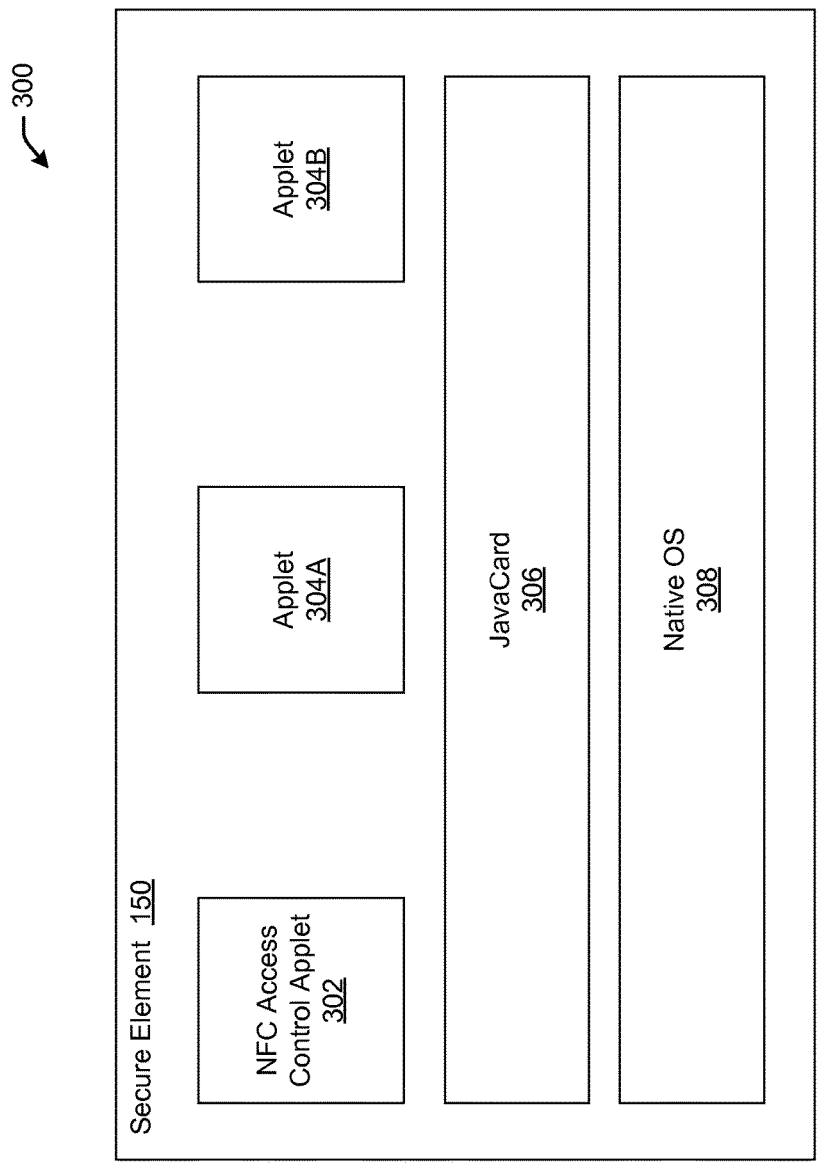
FIG. 3A is an illustrative embodiment of an NFC access control applet implementation in accordance with one or more embodiments of the disclosure.

FIG. 3A is an illustrative embodiment of an NFC access control applet implementation. In some embodiments, the secure element 150 may include an access control manager 151 in the form of an NFC access control applet 302, one or more applets 304A-304B (collectively referred to as 304), a Java Card 306, and/or a native O/S 308. The native O/S 308 may provide access to a micro controller that is executing within the secure element 150. The Java Card 306 may be a software technology that allows Java-based applications, also known as applets 304, to be run securely on smart cards and similar small memory footprint devices. The secure element 150 may store one or more keys. One or more applets 304 in the secure element 150 may be assigned an access level of privileged. The NFC access control manager 151 in the form of the NFC access control applet 302, for example, may receive a request from an applet 304 and based at least in part on one or more access control policies, forward the request to the NFC controller 148. The NFC access control applet 302 may execute securely on the secure element 150. The NFC access control applet 302 may be developed by a third-party developer.

Figure 3B:
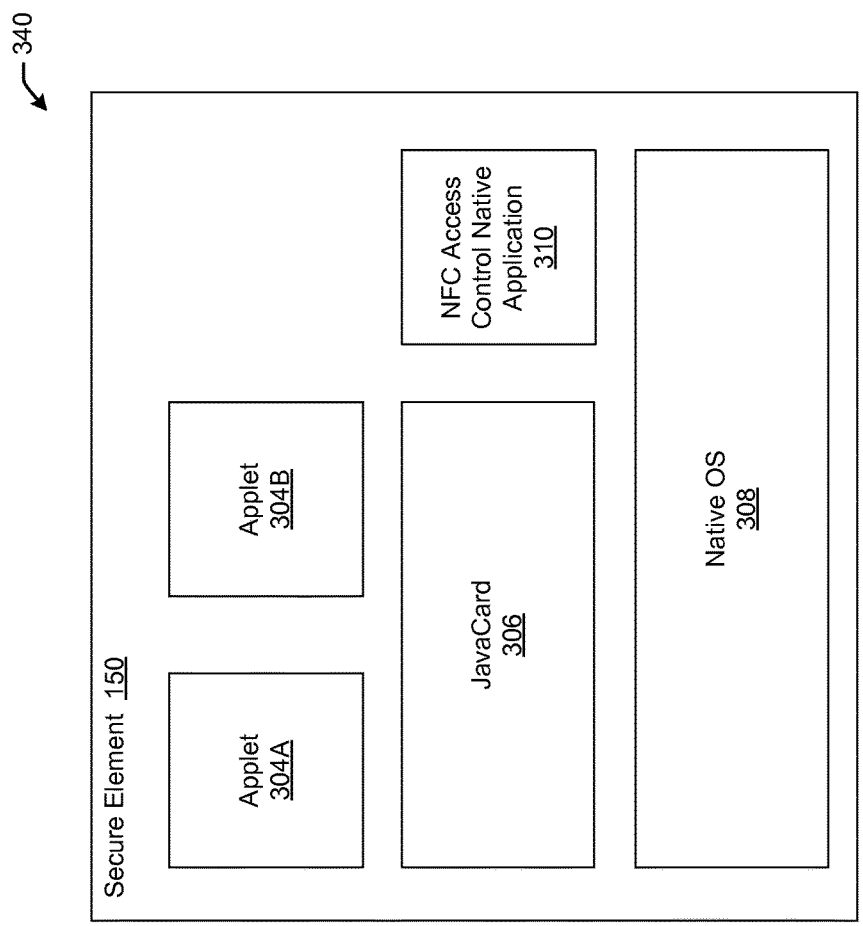
FIG. 3B is an illustrative embodiment of an NFC access control native implementation in accordance with one or more embodiments of the disclosure.

FIG. 3B is an illustrative embodiment of an NFC access control native implementation. This embodiment may be a variation of the implementation in FIG. 3A. The NFC access controller manager 151 may be in the form of an NFC access control native application 310 that executes on top of the native O/S 308. The NFC access control native application 310 may not use Java Card 306 thereby losing the portability offered by the NFC access control applet 302 in FIG. 3A, which means that if migrated to a different secure element with a different O/S, the native application 310 would have to be re-written specifically for the new secure element because, for example, the new secure element may have a different micro-controller. Because the NFC access control native application 310 executes at a native level, the native application 310 may invoke operations directly on the available hardware, thereby increasing performance. The NFC access control native application 310 may be authored by someone that is familiar with the firmware and hardware of the mobile device 102. For example, the NFC access control native application 310 may be developed by the vendor of the mobile device 102.

Figure 3C:
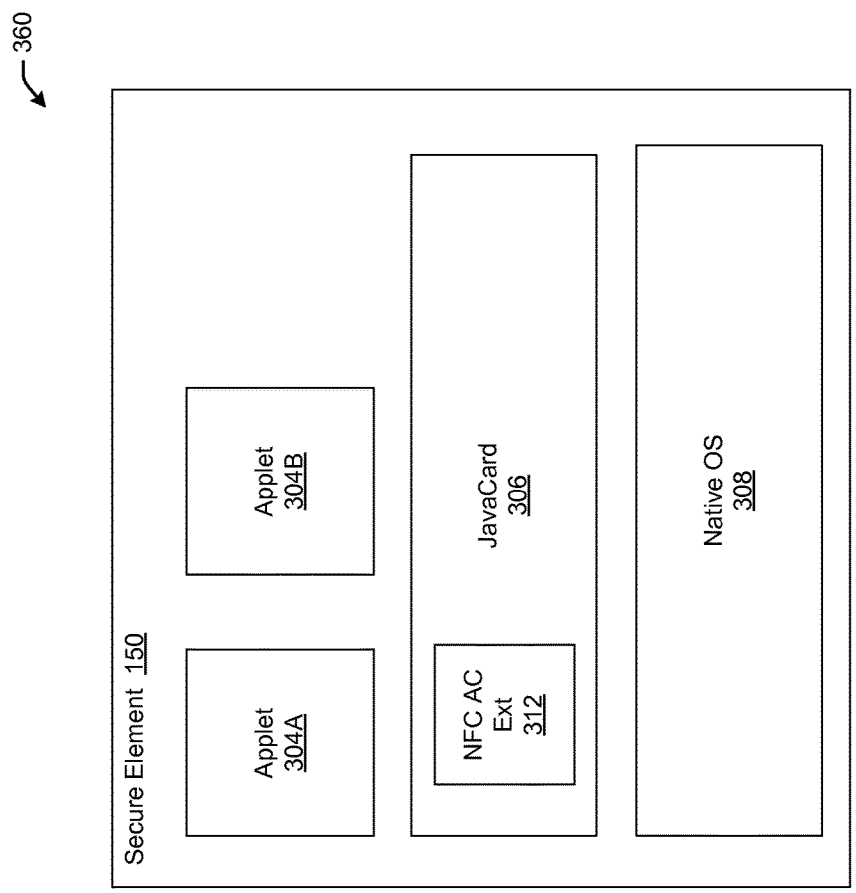
FIG. 3C is an illustrative embodiment of an NFC access control Java Card OS Extension implementation in accordance with one or more embodiments of the disclosure.

FIG. 3C is an illustrative embodiment of an NFC access control Java Card O/S Extension implementation. This embodiment is a variation of the implementation in FIGS. 3A and 3B. The NFC access control manager 151 may be in the form of an NFC access control Java Card O/S extension 312. The functionality of the NFC access control Java Card O/S extension 312 may be developed by the Java Card O/S vendor. The NFC access control Java Card O/S extension 312 may be part of the O/S as opposed to an application executing on top of the Java Card 306 or an application executing on top of the O/S 308. The performance of the NFC access control Java Card O/S extension 312 may be better than that of the NFC access control applet 302 but not as good as the NFC access control native applet 310.

The applets 304 depicted in FIG. 3A-3B may have different functionality. For example, the applets may be used to encrypt sensitive information, storing passwords, and the like. For example, an applet 304 may store multiple passwords. If a user provides a master password, the applet may release one of the stored passwords based at least in part on the site requesting the password.

Illustrative Processes

Figure 4:
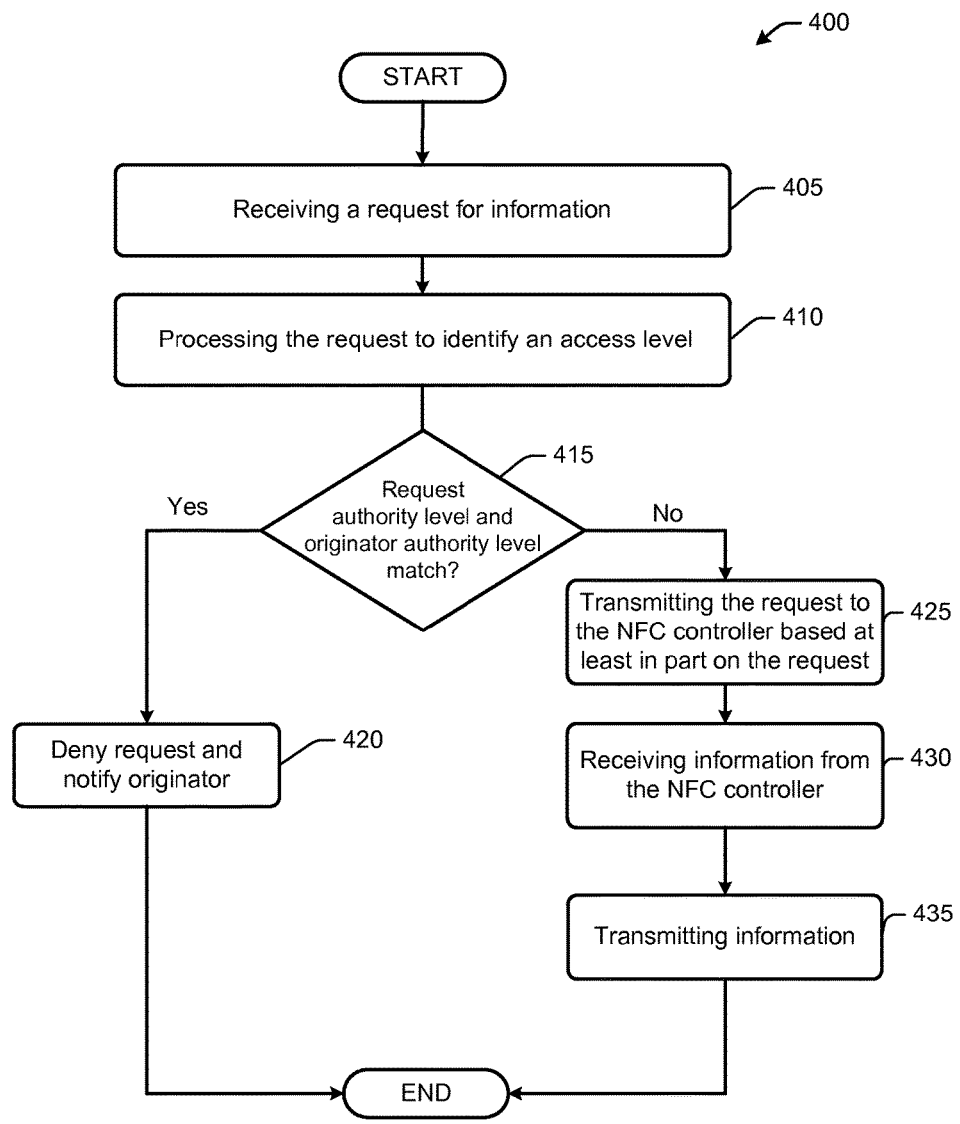
FIG. 4 is a process flow diagram of an illustrative method for NFC access control in a secure element centric architecture in accordance with one or more embodiments of the disclosure.

FIG. 4 is a process flow diagram of an illustrative method for NFC access control in a secure element centric architecture in accordance with one or more embodiments of the disclosure. At block 405, an access control manager 151 (e.g., NFC access control applet 302, NFC access control native application 310, and/or NFC access control Java Card operating system extension 312) of the secure element 150 may receive a request. In some embodiments, the information may be received from an application processor 132, a software executed by the application processor 132, an applet 304 within the secure element 150 or the like. In some embodiments, the request may be NFC traffic in the form of APDU transmitted from the SPI bus 212 associated with the application processor 132 to the SPI bus 214 associated with the secure element 150. The APDU may include an NCI packet in the payload.

At block 410, the access control manager 151 of the secure element 150 may process the request to identify an access level associated with the information and/or the originator. For example, the access control manager 151 of the secure element 150 may extract information from the APDU and apply one or more access control policies received from a trusted service manager 104. In some embodiments, the access control manager 151 of the secure element 150 must decrypt the one or more control policies received from the trusted service manager 104 based at least in part on a secure key that is stored in the secure element 104. The access control manager 151, based at least in part on one or more access control policies, may determine an authority level associated with the originator of the request. The access control manager 151, based at least in part on one or more access control policies, may determine an authority level associated with the request.

At block 415, the access control manager 151 of the secure element 150 determine whether the authority level associated with the request matches the authority level associated with the originator of the request. If the authority level associated with the request does not match the authority level associated with the originator of the request, then at block 420, the access control manager 151 may deny the request and notify the originator of the request of the denial.

If at block 415, the access control manager 151 determines the authority level associated with the request matches the authority level associated with the originator of the request, then at block 425, the access control manager 151 may transmit or forward the request to the NFC controller 148. In some embodiments, the access control manager 151 of the secure element 150 may transmit or forward the request from the originator from the SWP connector 216 to the SWP connector 218 associated with the NFC controller 148. The request may be transmitted in an HCP. The HCP may contain the information from the NCI packet from the APDU in the payload. The access control manager 151 may generate instructions to enable the NFC controller 148 to enter one of the three modes discussed above (e.g., card emulation mode, reader/writer mode, and/or peer-to-peer communication mode) based at least in part on the information received in the request and/or NFC traffic and may transmit the instructions with the forwarded request.

At block 430, the access control manager 151 may receive information from the NFC controller 148 responsive to the transmitted or forwarded request. In some embodiments, the NFC controller 148 may transmit the information obtained through NFC radio frequency interface from the SWP connector 218 to the SWP connector 216 associated with the secure element 150.

At block 435, the access control manager 151 may transmit or forward the information received from the NFC controller 151 to the originator of the request. The originator of the request, such as the application processor 132, may use the received information to complete a transaction or otherwise utilize the received information. In some embodiments, the originator may encrypt the received information using one or more known encryption techniques and transmit the encrypted information to a remote server for further processing or storage.

In one embodiment, a computer-readable medium may store computer-executable instructions which, when executed by a processor, cause the processor to perform operations which may include receiving a request for information; processing the received request to identify a first access level associated with the request and a second access level associated with an originator of the request; determining if the first access level matches the second access level; in response to determining the first access level does not match the second access level, transmitting a message to the originator of the request indicating a denial of the request; and in response to determining the first access level matches the second access level, transmitting the request to a near field communication (NFC) controller; receiving information from the NFC controller; and transmitting the information from the NFC controller to the originator of the request.

In one aspect of an embodiment, processing the received request to identify the first access level associated with the request and the second access level associated with the originator of the request may further include processing, based at least in part on one or more access control policies, the received request to identify the first access level associated with the request and the second access level associated with the originator of the request.

In one aspect of an embodiment, the computer-executable instructions may further cause the processor to perform operations including receiving the one or more access control policies from a trusted service manager, wherein the one or more access control policies are encrypted by the trusted service manager based at least in part on a secure key.

In one aspect of an embodiment, the computer-executable instructions may further cause the processor to perform operations including decrypting the one or more access control policies from the trusted service manager using a second locally stored secure key.

In one aspect of an embodiment, the computer-executable instructions may further cause the processor to perform operations including generating one or more instructions based at least in part on the request, wherein the one or more instructions instruct the NFC controller to enter a mode and transmitting the one or more instructions to the NFC controller.

In one aspect of an embodiment, the mode may be one of a card emulation mode, a reader/writer mode, or a peer-to-peer communication mode.

In one aspect of an embodiment, the information from the NFC controller may be received from an NFC enabled device.

In another embodiment, a method may be provided. The method may include receiving, by a secure element, a request for information; processing, by the secure element, the received request to identify a first access level associated with the request and a second access level associated with an originator of the request; determining, by the secure element, if the first access level matches the second access level; in response to determining the first access level does not match the second access level, transmitting, by the secure element, a message to the originator of the request indicating a denial of the request; and in response to determining the first access level matches the second access level, transmitting, by the secure element, the request to a near field communication (NFC) controller, receiving, by the secure element, information from the NFC controller; and transmitting, by the secure element, the information from the NFC controller to the originator of the request.

In one aspect of an embodiment, the method may include processing, by the secure element based at least in part on one or more access control policies, the received request to identify the first access level associated with the request and the second access level associated with the originator of the request.

In one aspect of an embodiment, the method may include receiving, by the secure element, the one or more access control policies from a trusted service manager, wherein the one or more access control policies are encrypted by the trusted service manager based at least in part on a secure key.

In one aspect of an embodiment, the method may include decrypting, by the secure element, the one or more access control policies from the trusted service manager using a second locally stored secure key.

In one aspect of an embodiment, the method may include generating, by the secure element, one or more instructions based at least in part on the request, wherein the one or more instructions instruct the NFC controller to enter a mode; and transmitting, by the secure element, the one or more instructions to the NFC controller.

In one aspect of an embodiment, the mode may be one of a card emulation mode, a reader/writer mode, or a peer-to-peer communication mode.

In one aspect of an embodiment, the method may include the information from the NFC controller that may be received from an NFC enabled device.

In one aspect of an embodiment, the secure element may include one of an NFC access control applet, an NFC control native application, or an NFC access control Java Card operating system extension.

In another embodiment, a device may be provided. The device may include at least one antenna; at least one transceiver; at least one near field communication (NFC) controller; at least one processor; at least one memory storing computer-executable instructions; and at least one secure element, wherein the at least one secure element is configured to access the at least one memory and to execute the computer-executable instructions to: receive a request for information; process the received request to identify a first access level associated with the request and a second access level associated with an originator of the request; determine if the first access level matches the second access level; in response to a determination that the first access level does not match the second access level, transmit a message to the originator of the request indicating a denial of the request; and in response to a determination that the first access level matches the second access level, transmit the request to the at least one NFC controller receive information from the at least one NFC controller; and transmit the information from the at least one NFC controller to the originator of the request.

In one aspect of an embodiment, to process the received request to identify the first access level associated with the request and the second access level associated with the originator of the request, the at least one secure element may be configured to access the at least one memory and to execute the computer-executable instructions to: process, based at least in part on one or more access control policies, the received request to identify the first access level associated with the request and the second access level associated with the originator of the request.

In one aspect of an embodiment, the at least one secure element may be configured to access the at least one memory and to execute the computer-executable instructions to:
receive the one or more access control policies from a trusted service manager, wherein the one or more access control policies are encrypted by the trusted service manager based at least in part on a secure key.

In one aspect of an embodiment, the at least one secure element may be configured to access the at least one memory and to execute the computer-executable instructions to: decrypt the one or more access control policies from the trusted service manager using a second locally stored secure key.

In one aspect of an embodiment, the at least one secure element may be configured to access the at least one memory and to execute the computer-executable instructions to: generate one or more instructions based at least in part on the request, wherein the one or more instructions instruct the at least one NFC controller to enter a mode; and transmit the one or more instructions to the at least one NFC controller.

In one aspect of an embodiment, the mode may be one of a card emulation mode, a reader/writer mode, or a peer-to-peer communication mode.

In one aspect of an embodiment, the information from the at least one NFC controller may be received from an NFC enabled device.

In one aspect of an embodiment, the secure element may include at least one of an NFC access control applet, an NFC control native application, or an NFC access control Java Card operating system extension.

In another embodiment, a system may be provided. The system may include a means for receiving a request for information; a means for processing the received request to identify a first access level associated with the request and a second access level associated with an originator of the request; a means for determining if the first access level matches the second access level; in response to determining the first access level does not match the second access level, a means for transmitting a message to the originator of the request indicating a denial of the request; and in response to determining the first access level matches the second access level, a means for transmitting the request to a near field communication (NFC) controller; a means for receiving information from the NFC controller; and a means for transmitting the information from the NFC controller to the originator of the request.

In one aspect of an embodiment, the means for processing the received request to identify the first access level associated with the request and the second access level associated with the originator of the request may further include a means for processing, based at least in part on one or more access control policies, the received request to identify the first access level associated with the request and the second access level associated with the originator of the request.

In one aspect of an embodiment, the system may include a means for receiving the one or more access control policies from a trusted service manager, wherein the one or more access control policies are encrypted by the trusted service manager based at least in part on a secure key.

In one aspect of an embodiment, the system may include a means for decrypting the one or more access control policies from the trusted service manager using a second locally stored secure key.

In one aspect of an embodiment, a means for generating one or more instructions based at least in part on the request, wherein the one or more instructions instruct the NFC controller to enter a mode; and a means for transmitting the one or more instructions to the NFC controller.

In one aspect of an embodiment, the mode may be one of a card emulation mode, a reader/writer mode, or a peer-to-peer communication mode.

In one aspect of an embodiment, the information from the NFC controller may be received from an NFC enabled device.

In one aspect of an embodiment, the secure element may include at least one of an NFC access control applet, an NFC control native application, or an NFC access control Java Card operating system extension.

Conclusion

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A non-transitory computer-readable medium storing computer-executable instructions which, when executed by a secure element, cause the secure to perform operations comprising:
   receiving, using a full duplex interface protocol, a request for information from an application processor on a full duplex interface, wherein:
      the full duplex interface connects the application processor to the secure element, and wherein the application processor and the secure element are part of a device, and
      the request for information is a near field communication (NFC) controller interface (NCI) packet in an application protocol data unit (APDU);
   receiving one or more access control policies from a trusted service manager, wherein the one or more access control policies are encrypted by the trusted service manager based at least in part on a first secure key;
   decoding the one or more access control policies, from the trusted service manager, based at least in part on a second locally stored secure key;
   processing the received request, based at least in part on the one or more access control policies, to identify a first access level associated with the request and a second access level associated with an originator of the request;
   determining if the first access level matches the second access level;
   in response to determining the first access level matches the second access level, transmitting the request to a NFC controller through the secure element using a single wire protocol interface without a direct connection between the application processor and the NFC controller;
   receiving information from the NFC controller; and
   transmitting the information from the NFC controller to the originator of the request.

2. The non-transitory computer-readable medium of claim 1, wherein the computer-executable instructions further cause the secure element to perform operations comprising:
   generating one or more instructions based at least in part on the request, wherein the one or more instructions instruct the NFC controller to enter a mode; and
   transmitting the one or more instructions to the NFC controller.

3. The non-transitory computer-readable medium of claim 1, wherein the mode is one of a card emulation mode, a reader/writer mode, or a peer-to-peer communication mode.

4. The non-transitory computer-readable medium of claim 1, wherein the information from the NFC controller is received from an NFC enabled device.

5. A computer-implemented method comprising:
receiving, by a secure element using a full duplex interface protocol, a request for information, from an application processor on a full duplex interface, wherein:
the full duplex interface connects the secure element to the application processor, the secure element and the application processor are in a device, and
the request for information is a near field communication (NFC) controller interface (NCI) packet in an application protocol data unit (APDU);
receiving, by the secure element, one or more access control policies from a trusted service manager, wherein the one or more access control policies are encrypted by the trusted service manager based at least in part on a first secure key;
decoding the one or more access control policies, from the trusted service manager, based at least in part on a second locally stored secure key;
processing, by the secure element, the received request, based at least in part on the one or more access control policies, to identify a first access level associated with the request and a second access level associated with an originator of the request;
determining, by the secure element, if the first access level matches the second access level;
in response to determining the first access level matches the second access level, transmitting the request to a NFC controller through the secure element using a single wire protocol interface without a direct connection between the application processor and the NFC controller;
receiving, by the secure element, information from the NFC controller; and
transmitting, by the secure element, the information from the NFC controller to the originator of the request.

6. The computer-implemented method of claim 5, further comprising:
generating, by the secure element, one or more instructions based at least in part on the request, wherein the one or more instructions instruct the NFC controller to enter a mode; and
transmitting, by the secure element, the one or more instructions to the NFC controller.

7. The computer-implemented method of claim 5, wherein the mode is one of a card emulation mode, a reader/writer mode, or a peer-to-peer communication mode.

8. The computer-implemented method of claim 7, wherein the information from the NFC controller is received from an NFC enabled device.

9. The computer-implemented method of claim 5, wherein the secure element comprises at least one of an NFC access control applet, an NFC control native application, or an NFC access control Java Card operating system extension.

10. A device comprising:
one or more antennas;
one or more radios;
at least one transceiver;
at least one near field communication (NFC) controller;
at least one processor;
at least one memory storing computer-executable instructions; and
at least one secure element, wherein the at least one secure element is configured to access the at least one memory and to execute the computer-executable instructions to:
receive using a full duplex interface protocol, a request for information from an application processor on a full duplex interface, wherein the full duplex interface connects the at least one secure element to the application processor, and the request for information is a NFC controller interface (NCI) packet in an application protocol data unit (APDU);
receive one or more access control policies from a trusted service manager, wherein the one or more access control policies are encrypted by the trusted service manager based at least in part on a first secure key;
decode the one or more access control policies, from the trusted service manager, based at least in part on a second locally stored secure key;
process the received request, based at least in part on the one or more access control policies, to identify a first access level associated with the request and a second access level associated with an originator of the request;
determine if the first access level matches the second access level;
in response to determining the first access level matches the second access level, transmitting the request to at least one NFC controller through the at least one secure element using a single wire protocol interface without a direct connection between the application processor and the at least one NFC controller;
receive information from the at least one NFC controller; and
transmit the information from the at least one NFC controller to the originator of the request.

11. The device of claim 10, wherein the at least one secure element is configured to access the at least one memory and to execute the computer-executable instructions to:
generate one or more instructions based at least in part on the request, wherein the one or more instructions instruct the at least one NFC controller to enter a mode; and
transmit the one or more instructions to the at least one NFC controller.

12. The device of claim 10, wherein the mode is one of a card emulation mode, a reader/writer mode, or a peer-to-peer communication mode.

13. The device of claim 12, wherein the information from the at least one NFC controller is received from an NFC enabled device.

14. The device of claim 10, wherein the at least one secure element comprises at least one of an NFC access control applet, an NFC control native application, or an NFC access control Java Card operating system extension.

* * * * *